United States Patent
Bartus et al.

(10) Patent No.: US 8,257,814 B2
(45) Date of Patent: Sep. 4, 2012

(54) PROTECTIVE COMPOSITE STRUCTURES AND METHODS OF MAKING PROTECTIVE COMPOSITE STRUCTURES

(75) Inventors: Shane Bartus, Baltimore, MD (US); George Husman, Chesterfield, MO (US); Uday Vaidya, Birmingham, AL (US)

(73) Assignee: University of Alabama at Birmingham, Birmingham, AL (US)

( * ) Notice: Subject to any disclaimer, the term of this patent is extended or adjusted under 35 U.S.C. 154(b) by 870 days.

(21) Appl. No.: 11/993,171

(22) PCT Filed: Jun. 23, 2006

(86) PCT No.: PCT/US2006/024470
§ 371 (c)(1), (2), (4) Date: Jan. 22, 2009

(87) PCT Pub. No.: WO2008/036066
PCT Pub. Date: Mar. 27, 2008

(65) Prior Publication Data
US 2009/0214812 A1    Aug. 27, 2009

Related U.S. Application Data

(60) Provisional application No. 60/693,148, filed on Jun. 23, 2005.

(51) Int. Cl.
*B32B 27/02* (2006.01)
*B32B 27/04* (2006.01)
*B32B 27/06* (2006.01)
*F41H 5/00* (2006.01)
*F41H 5/02* (2006.01)
*F41H 5/04* (2006.01)
*F41H 5/06* (2006.01)

(52) U.S. Cl. ....... 428/68; 428/339; 428/423.1; 428/426; 428/457; 428/474.4; 428/500; 89/36.01; 89/36.02; 89/36.04; 89/36.05; 89/36.07; 89/36.08; 89/36.11; 89/36.12; 89/901; 89/903; 89/904; 89/906; 89/907; 89/908; 89/909; 442/134; 442/135; 264/171.11

(58) Field of Classification Search ............... 89/36.01, 89/36.02, 36.04, 36.05, 36.07, 36.11, 36.12, 89/901, 903, 904, 906, 907, 908, 909, 910, 89/912, 913, 914, 915, 916, 917, 918, 920, 89/921, 922; 264/171.11; 442/134, 135; 428/68, 423.1, 474.4, 500, 426, 339, 457
See application file for complete search history.

(56) References Cited

U.S. PATENT DOCUMENTS 3,684,645 A * 8/1972 Temple et al. ............... 428/220
5,061,545 A   10/1991 Li et al.
(Continued)

OTHER PUBLICATIONS

International Search Report and Written Opinion, dated Aug. 4, 2008.

*Primary Examiner* — David Sample
*Assistant Examiner* — Kendra Keith
(74) *Attorney, Agent, or Firm* — Thomas, Kayden, Horstemeyer & Risley, LLP (57) ABSTRACT

Composite structures and methods of fabrication thereof are disclosed. An embodiment of a composite structure, among others, includes: a backing substrate; a layer of structures distributed over the backing substrate; and a thermoplastic disposed onto the structures and the backing substrate, wherein the thermoplastic substantially binds the backing substrate and layer of structures together.

21 Claims, 5 Drawing Sheets

U.S. PATENT DOCUMENTS

| | | |
|---|---|---|
| 5,411,497 A | 5/1995 | Tanzer et al. |
| 6,510,777 B2 | 1/2003 | Neal |
| 6,532,857 B1 * | 3/2003 | Shih et al. ............... 89/36.02 |
| 6,558,146 B1 | 5/2003 | Shah et al. |
| 6,642,159 B1 | 11/2003 | Bhatnagar et al. |
| 6,709,735 B2 | 3/2004 | Posey et al. |
| 6,792,843 B2 | 9/2004 | Mohr et al. |
| 6,846,758 B2 | 1/2005 | Bhatnagar et al. |
| 2002/0034624 A1 | 3/2002 | Harpell et al. |
| 2002/0037409 A1 | 3/2002 | Tunis |
| 2002/0123287 A1 | 9/2002 | Davies et al. |
| 2002/0178900 A1 * | 12/2002 | Ghiorse et al. ............ 89/36.02 |
| 2002/0198301 A1 | 12/2002 | Campbell et al. |
| 2003/0064191 A1 * | 4/2003 | Fisher ....................... 428/49 |
| 2005/0066805 A1 | 3/2005 | Park et al. |
| 2005/0072294 A1 | 4/2005 | Cohen |

* cited by examiner

PROTECTIVE COMPOSITE STRUCTURES AND METHODS OF MAKING PROTECTIVE COMPOSITE STRUCTURES

CROSS-REFERENCE TO RELATED APPLICATION

This application claims priority to U.S. provisional application entitled, "Protective Composite Structure," having Ser. No. 60/693,148, filed on Jun. 23, 2005, which is entirely incorporated herein by reference.

TECHNICAL FIELD

The present disclosure is generally related to composite structures for absorbing and dissipating kinetic energy.

BACKGROUND

Many different kinds of composite structures are currently used in a wide range of applications where it is desirable to provide protection against explosions and projectiles, including, for example, armor systems for personnel, vehicles, and aircraft. Early protective structures tended to rely on a single layer of a hard material, such as metallic or ceramic plates, to provide protection. Ceramic plates provide a weight reduction compared to steel plates, which can increase the mobility of armored vehicles or reduce support requirements in buildings. However, the high rigidity and hardness of ceramic plates makes them vulnerable to brittle fracture from mechanical impacts reducing their effectiveness to multiple strikes. Therefore, such structures could be improved considerably if the ceramic materials were affixed to energy absorbing backing material. Typically, metal or ceramic plates are adhesively secured to a ballistic resistant substrate, such as Kevlar™ or Dyneema™ materials. Continued development in protective systems considers the optimization of protection, weight, maintainability, and cost.

Armoring of vehicles must satisfy seemingly incompatible goals: uncomplicated maneuverable vehicles that can sustain the rigors of combat and the weight of armoring, while maintaining full functionality to perform required missions and maximizing ease of repair to minimize service time. Military and support vehicles in recent combat zones now require protection from increasingly lethal threats. These include ballistic projectiles and explosions that propagate a blast wave and fragments. Studies have shown that a structure exposed to a combination of the blast wave and fragments will collapse more readily than on exposure to the blast wave or fragments alone. Further, distance from the explosion affects the results because fragments arrive before the blast wave at distances beyond three meters from the source. Weight reduction is critical to maintaining maneuverability and flexibility of vehicles to perform their required missions. Further, manufacturability of original articles, availability of material, and reparability in the field is of the utmost importance to maximize mission availability and minimize cost of production and maintenance.

SUMMARY

Briefly described, embodiments of this disclosure include composite structures and methods of fabrication thereof. An embodiment of a composite structure, among others, includes: a backing substrate; a layer of structures distributed over the backing substrate; and a thermoplastic disposed onto the structures and the backing substrate, wherein the thermoplastic substantially binds the backing substrate and layer of structures together.

Another embodiment of a composite structure, among others, includes: a backing substrate; a layer of structures distributed over the backing substrate, wherein the structures can include, but are not limited to, ceramic plates, metallic plates, and combinations thereof; and a long fiber thermoplastic disposed onto the structures and the backing substrate, wherein the long fiber thermoplastic substantially binds the backing substrate and layer of structures together. The long fiber thermoplastic includes: a material such as, but not limited to, thermoplastic polyurethanes, polypropylene, nylon-based polymers, polystyrene, acrylonitrile butadiene styrene (ABS), styrene acrylonitrile (SAN), polyethersulphone (PES), polyetherimide (PEI), polyphenylene sulfide (PPS), polyetheretherketone (PEEK), polyetherketone (PEK), and combinations thereof; and a fiber such as, but not limited to, an aramid fiber, a nylon fiber, a glass fiber, a carbon fiber, and combinations thereof, wherein the fiber has a length of about 12 to 38 mm.

An embodiment of a method for fabricating a composite structure, among others, includes: providing a backing substrate; disposing structures over the backing substrate; and disposing a thermoplastic onto the structures and the backing substrate.

BRIEF DESCRIPTION OF THE DRAWINGS

Many aspects of this disclosure can be better understood with reference to the following drawings. The components in the drawings are not necessarily to scale, emphasis instead being placed upon clearly illustrating the principles of the present disclosure; Moreover, in the drawings, like reference numerals designate corresponding parts throughout the several views.

DETAILED DESCRIPTION

Embodiments of the present disclosure will employ, unless otherwise indicated, techniques of chemistry, material science, physics, engineering, and the like, which are within the skill of the art. Such techniques are explained fully in the literature.

The following examples are put forth so as to provide those of ordinary skill in the art with a complete disclosure and description of how to perform the methods and use the embodiments disclosed and claimed herein. Efforts have been made to ensure accuracy with respect to numbers (e.g., amounts, temperature, etc.), but some errors and deviations should be accounted for. Unless indicated otherwise, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Discussion

Protective composite structures and methods of making protective composite structures are disclosed. In general, the present disclosure utilizes combinations of impact or ballistic resistant materials with metallic and/or ceramic structures (e.g., plates or smaller structures) that can be optimized in terms of protection, weight, maintainability, service life, and/or cost. The composite structures have civilian and military applications in the protection of personnel, vehicles, buildings, shelters, and the like. The protective composite structures are capable of absorbing and/or dissipating kinetic energy from a variety of sources. In particular, the protective composite structures are capable of withstanding the effects of blast waves and/or fragments produced by explosions, as well as the impact of ballistic projectiles and other impacts with various other structures (e.g., vehicle collision).

As mentioned above, the protective composite structure utilizes combinations of impact or ballistic resistant materials with metallic and/or ceramic structures. In particular, the protective composite structure includes, but is not limited to, a thermoplastic (e.g., a thermoplastic and/or a long fiber thermoplastic (LFT)) that is disposed on, among, and/or in (e.g., penetrating) a backing substrate and/or one or more metallic and/or ceramic structures. The thermoplastic (e.g., LFT) is disposed onto the other components of the protective composite structure in a malleable, moldable, or melted form so that the thermoplastic can fill into spaces among the other components. In an embodiment, the thermoplastic flows into or penetrates portions of the backing substrate (e.g., fabric, polymer fibers, metal/steel fibers, and the like) and cools within those areas to form a solid structure incorporating the backing substrate and metallic and/or ceramic structures. The protective composite structure can be formed into a simple geometry (e.g., flat or slightly curved structures) or a complex geometry (e.g., contoured and/or curved structures (e.g., body armor) or complex structures with multiple curves and/or contours (e.g., helmets, corner structures, and the like)). The term "LFT" is used for many of the embodiments described in this disclosure, but a thermoplastic can be used in place of or in addition to the LFT in each reference to LFT for the composite structures described herein.

Figure 1:
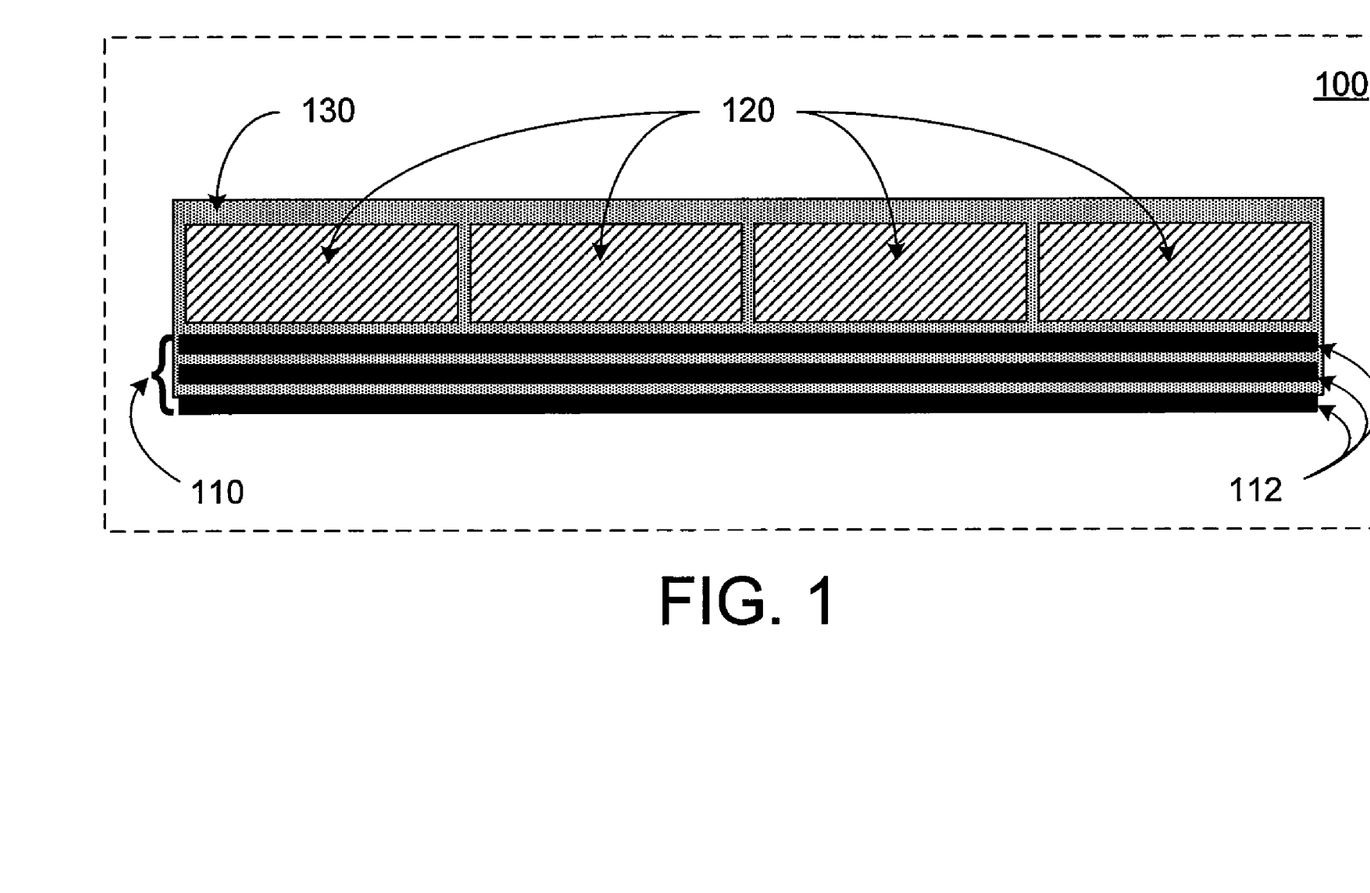
FIG. 1 is a schematic representation of an embodiment of a protective composite structure.

FIG. 1 is a schematic representation of the construction of a non-limiting embodiment of a protective composite structure 100. The composite structure 100 includes a backing substrate 110 and a layer of plates 120 (or another metallic and/or ceramic structure). A LFT 130 is disposed over the plates 120 and the backing substrate 110. The LFT 130 may encapsulate both the plates 120 and the backing substrate 110. In another embodiment, the LFT 130 may encapsulate the plates 120 and interact (e.g., penetrate to a certain depth) with the surface of the backing substrate 110. Configurations and materials can be varied to optimize desired characteristics for particular applications. For example, the protective composite structure 100 can be tailored for the appropriate protection, weight, geometric shape, maintainability, service life, and/or cost based on the particular application.

The backing substrate 110 is composed of one or more backing substrate layers 112 that provide support and reinforcement for the layer of plates 120. The backing substrate layers 112 include materials such as, but not limited to, high strain-energy fibers, including aramid fibers, polyethylene fibers, S2-glass fibers, E-glass fibers, carbon fibers, metal fibers, steel fibers, other structural, energy absorbing fibers, and combinations thereof. The materials can be a part of or embedded in polymer matrix materials including, but not limited to, polypropylene, polyurethane, polycarbonate, vinyl ester, epoxy, nylon, and other energy absorbing thermosetting, thermoplastic or elastomeric polymers or any combination thereof. The fibers can be formed into strands or otherwise configured. In addition, the term "fiber" can include strands or other fiber-like structures having a greater diameter or a plurality of fibers.

The backing substrate layers 112 can be 2-dimensional or 3-dimensional woven materials, laminated layers made from continuous fiber reinforced tapes, and long discontinuous fiber reinforced polymers, all made using any of the fibers listed previously or any combination of these fibers in conjunction with matrix polymers of the types listed above. Combinations of these materials can provide an optimized balance between stiffness and strain energy absorption.

It should be noted that long discontinuous fiber reinforced thermoplastic polymers, such as, but not limited to, glass/polypropylene or glass/polyurethane composites can contain damage from high-speed dynamic impacts. Significant amounts of energy can be absorbed during dynamic deflection of the long fiber materials without failure.

The plates 120 are composed of a metallic and/or ceramic material and are distributed over and/or in the backing substrate 110. Suitable ceramic materials can include, but are not limited to, barium titanate, strontium titanate, calcium zirconate, magnesium zirconate, boron carbide, silicon carbide, high purity aluminum oxide, titanium diboride, aluminum nitride, silicon nitride, sintered silicon carbide, sintered boron carbide, and sintered silicon nitride ceramics. Suitable metallic materials can include, but are not limited to, titanium, steel, aluminum, and alloys thereof, or other possible alloys. Suitable materials can be selected for the appropriate protection, weight, shape, maintainability, service life, and/or cost based on the particular application.

Figure 2:
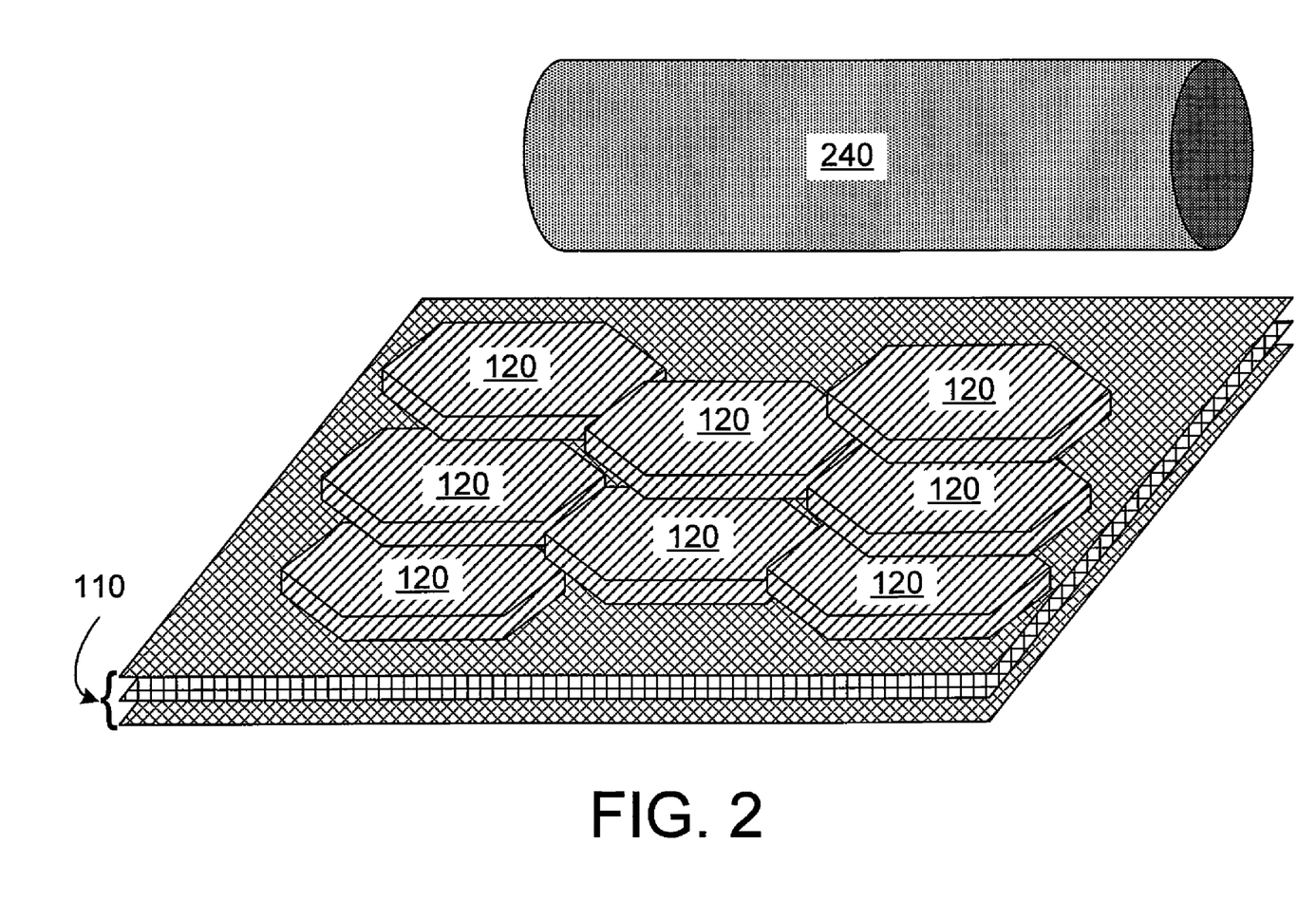
FIG. 2 is an illustration of the components utilized in an embodiment of a protective composite structure.

The plates 120 can be distributed in a layer over the backing substrate 110 to optimize protection, weight, size, and encapsulation. In another embodiment, multiple layers of the plates can be used with a backing material 110 and/or the LFT 130 between the layers. The plates 120 of the same or different sizes and shapes can be distributed over the backing substrate 110 in overlapping patterns as illustrated in FIG. 2. The shapes of the plates 120 can be flat, curved, contoured, or have a complex geometry with varying thickness and planar geometry's, such as, but not limited to, square, rectangular, hexagonal, round, oval, and combinations thereof. The plates 120 could have other three-dimensional shapes such as spheres, pellets, cylinders, football-shaped, and combinations thereof. Alternatively, the plates 120 can be arranged adjacent one another to form a uniform geometric pattern. In addition, metallic and ceramic plates can be combined in single or multiple layers to optimize the desired performance of the protective composite structure 100.

The LFT 130 is disposed onto the layer of plates 120 and the backing substrate 110, forming a continuous structure or a substantially continuous structure, where the layer of plates 120 and the backing substrate 110 are bonded or encapsulated, or substantially bonded or encapsulated by the LFT 130. The LFT 130 material can be produced by hot-melt impregnation, for example, of fibers with one or several types of thermoplastic resins.

The LFT 130 includes materials such as, but not limited to, thermoplastic polyurethanes, polypropylene, nylon-based polymers, polystyrene, acrylonitrile butadiene styrene (ABS), styrene acrylonitrile (SAN), polyethersulphone (PES), polyetherimide (PEI), polyphenylene sulfide (PPS), polyetheretherketone (PEEK), polyetherketone (PEK), and combinations thereof, in conjunction with reinforcement fibers or materials such as aramid fibers (e.g., KEVLAR™ SPECTRA™, ZYLON™, TWARON™, DYNEEMA™, and the like), nylon fibers, glass fibers or materials, carbon, and combinations thereof.

The LFT 130 has fiber lengths ranging from about 3 to 50 mm, about 12 to 50 mm, and about 12 to 38 mm. The LFT 130 can include fiber loading from about 10 to 80 weight % loading of fiber in the LFT 130 for any of these fiber lengths. Properties of the LFT 130 material include, but are not limited to, fiber length and aspect ratio (length/diameter) can be varied to optimize the strength, modulus, and impact properties of the composite as well as influence other mechanical and physical properties of the composite structure.

Embodiments including the thermoplastic without the long fiber can include materials such as, but not limited to, thermoplastic polyurethanes, polypropylene, nylon-based polymers, polystyrene, acrylonitrile butadiene styrene (ABS), styrene acrylonitrile (SAN), polyethersulphone (PES), polyetherimide (PEI), polyphenylene sulfide (PPS), polyetheretherketone (PEEK), polyetherketone (PEK), and combinations thereof.

FIG. 2 is an exemplary embodiment that illustrates the encapsulation material extruded as a LFT 130 filled charge 240 that is disposed onto portions of the plates 120 and backing substrate 110. Other possible approaches include, but are not limited to, injection/compression molding and direct compression of LFT pellets. Variations in the LFT 130 material can also influence processing parameters such as melt flow and fiber orientation during molding.

In addition to bonding the plates 120 to the backing substrate 110, the LFT 130 forms an energy absorbent layer over and/or around the plates 120. This energy absorbent layer of LFT 130 absorbs and/or reduces imparted kinetic energy. In an embodiment, the energy absorbent layer of LFT 130 reduces the effect of blast waves and slows fragments produced by an explosion. In another embodiment, the energy absorbent layer of LFT 130 slows a projectile thereby reducing its effect. By absorbing energy from the explosion and/or projectile, impact, and/or damage to the plates 120 is prevented and/or minimized.

The LFT 130 encapsulation process results in excellent environmental resistance to humidity and extreme temperatures, resistance to wear and tear from dirt, debris and fire, and a design that can be readily repaired in field or shop, relative to current technologies. Repair and replacement of damaged composite structures can be readily carried out using hot gas, ultrasonic, and/or resistance welding as well as other thermoplastic joining methods.

Figure 3:
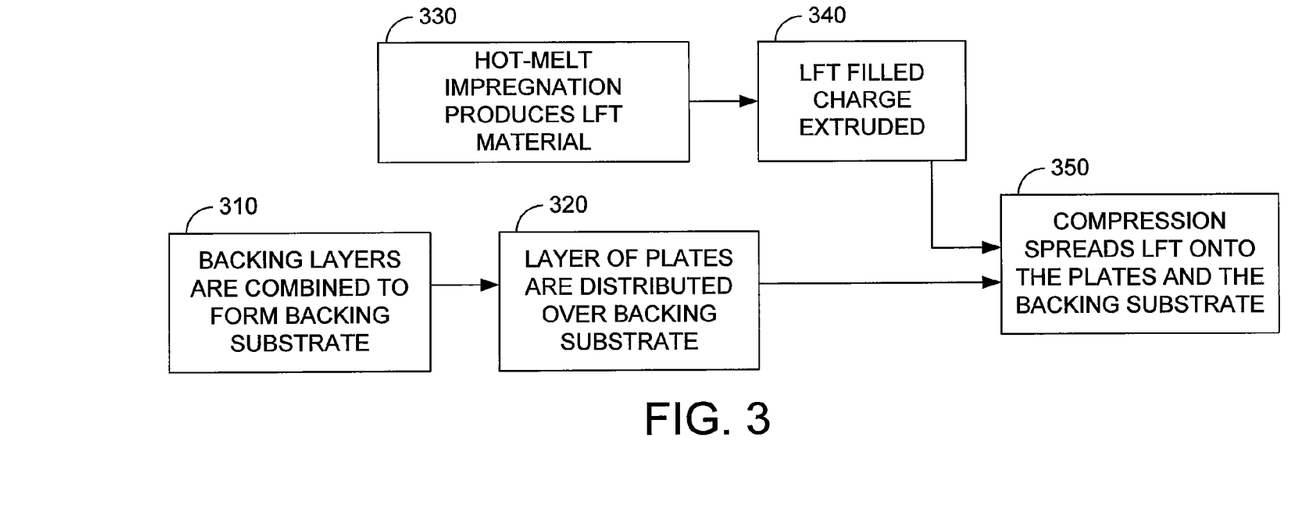
FIG. 3 is an illustrative flow chart describing an embodiment of the production of an embodiment of a protective composite structure.

For the purposes of illustration, the following section describes a processing sequence proposed for the fabrication of a protective composite structure 100 as shown in FIG. 1. One skilled in the art would understand how the fabrication processes would proceed, based upon the flow chart of FIG. 3A, the schematic representation of FIG. 4, and the associated discussion. As mentioned above, the term "LFT" is used for many of the embodiments described in this disclosure, but a thermoplastic can be used in place of or in addition to the LFT in each reference to LFT for the methods described herein.

A non-limiting method for producing a protective composite structure 100 is illustrated in the flow chart of FIG. 3. In Block 310, one or more backing substrate layers 112 are combined to form the backing substrate 110. In Block 320, a layer of plates 120 is then distributed over the backing substrate 110. In another embodiment, the plates 120 can be replaced with structures having different dimensions and shapes. In Block 330, in parallel, the LFT 130 material is produced using a method including, but not limited to, hot-melt impregnation. In Block 340, this material is then extruded as a LFT 130 filled charge 240 for spreading. In Block 350, compression of the extruded charge 240 spreads the LFT 130 material onto the layer of plates 120 and backing substrate 110.

Figure 4:
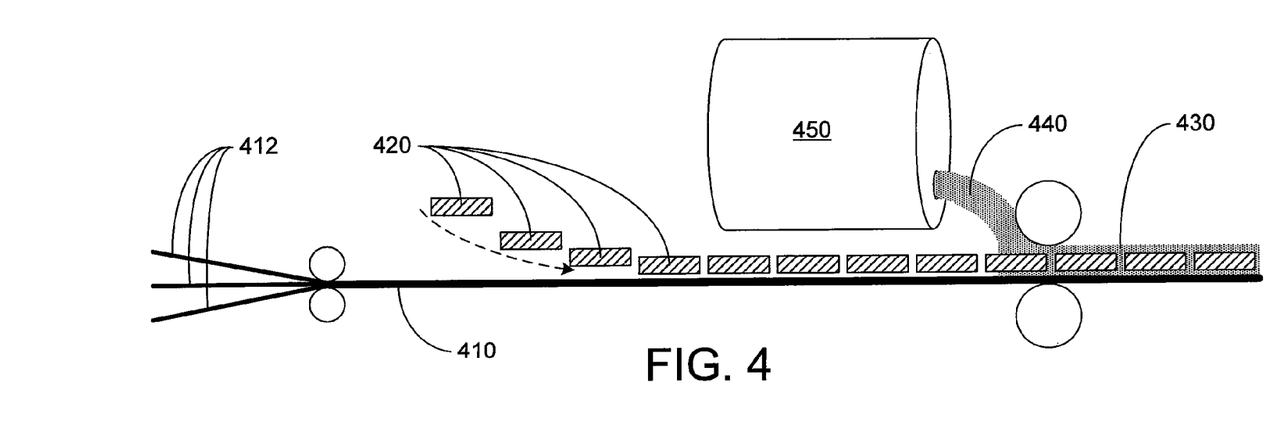
FIG. 4 is a schematic representation of an embodiment of the production of a protective composite structure.

A non-limiting process for producing a protective composite structure 100 is schematically represented in FIG. 4. In this implementation, backing layers 412 of the same or different materials are combined to form a backing substrate 410. The metallic or ceramic plates 420 are then distributed over the backing substrate 410 to form a protective layer. The plates 420 may be distributed in a random or predetermined pattern with the plates 420 overlapping or adjacent to one another, with or without touching each other. The LFT 430 is produced by hot-melt impregnation, for example, of fibers with one or more types of thermoplastic resins. The LFT material is fed through a plasticator 450 where it is extruded as a heated LFT filled charge 440 ready for spreading. Compression is used to spread the LFT 430 onto the layer of plates 420 and the backing substrate 410, forming a continuous structure or substantially continuous structure bound by the LFT 430.

The protective composite structures utilizing the long fiber thermoplastic can provide an optimized balance between weight, stiffness, and strain energy absorption over a wide range of applications. In addition, the ability to produce parts requiring complex geometry, low profile, and durable finish provides the ability to replace components in many existing applications as well as adapt to new applications as they develop. For example, the protective composite structures can be used in body armor, vehicle armor, aircraft armor, helicopter armor, marine armor, and the like. The shapes of the armor can be flat, curved, and/or complex. In addition, the protective composite structures can be used for buildings and infrastructure.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range.

It should be emphasized that the above-described embodiments of the present disclosure are merely possible examples of implementations, and are merely set forth for a clear understanding of the principles of the disclosure. Many variations and modifications may be made to the above-described embodiments. For example, variation of backing layer combinations could provide optimized solutions for different environments. Further, additional layers of material over the layer of plates could provide additional energy absorption capabilities to the long fiber thermoplastic encapsulation. All such modifications and variations are intended to be included herein within the scope of this disclosure and protected by the following claims.

EXAMPLES

Figure 5:
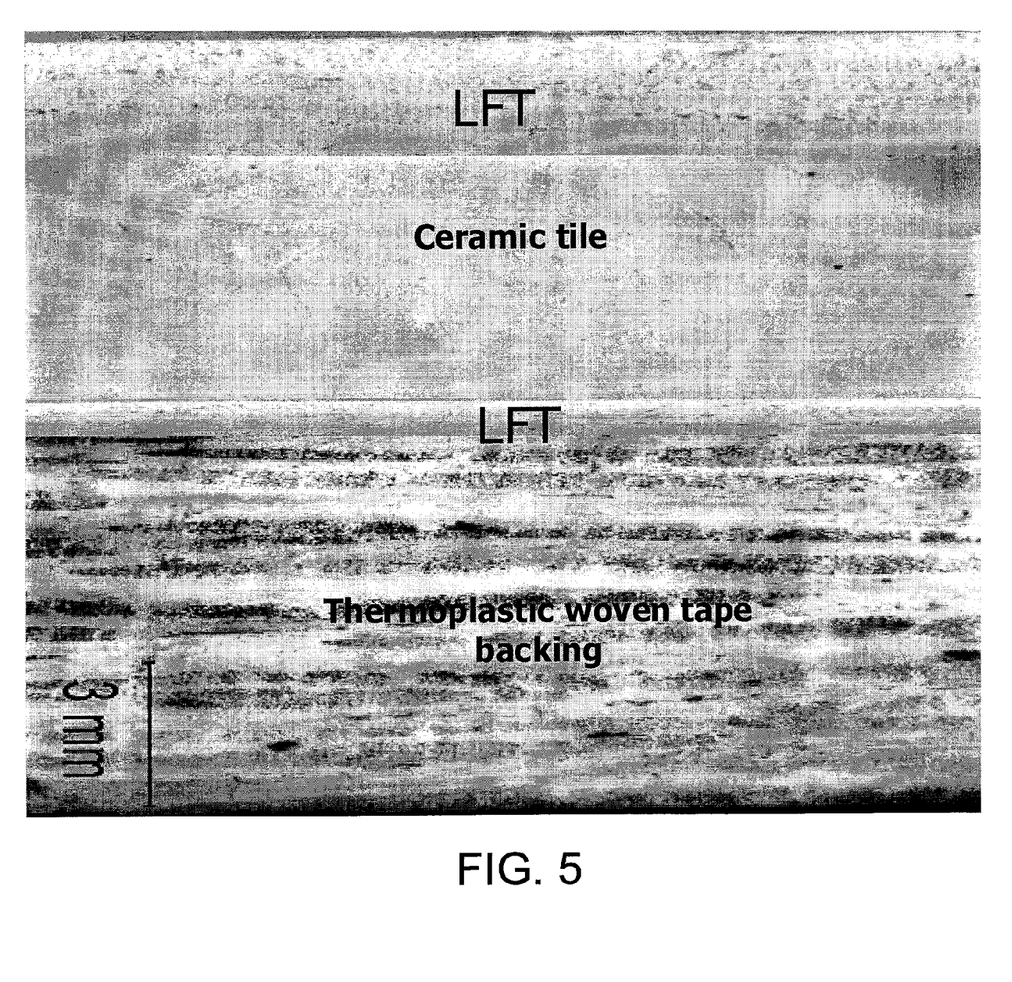
FIG. 5 is a digital image of an exemplary embodiment of a protective composite structure.

FIG. 5 is a digital image of an exemplary embodiment of a protective composite structure. The protective composite structure includes an LFT (S2-glass LFT with 60% by weight fiber loading), encapsulating a ceramic tile (alumina ceramic tile of 0.5" thickness), and a thermoplastic woven tape backing that includes (S2-glass/polypropylene backing of 0.5" thickness).

Figure 6:
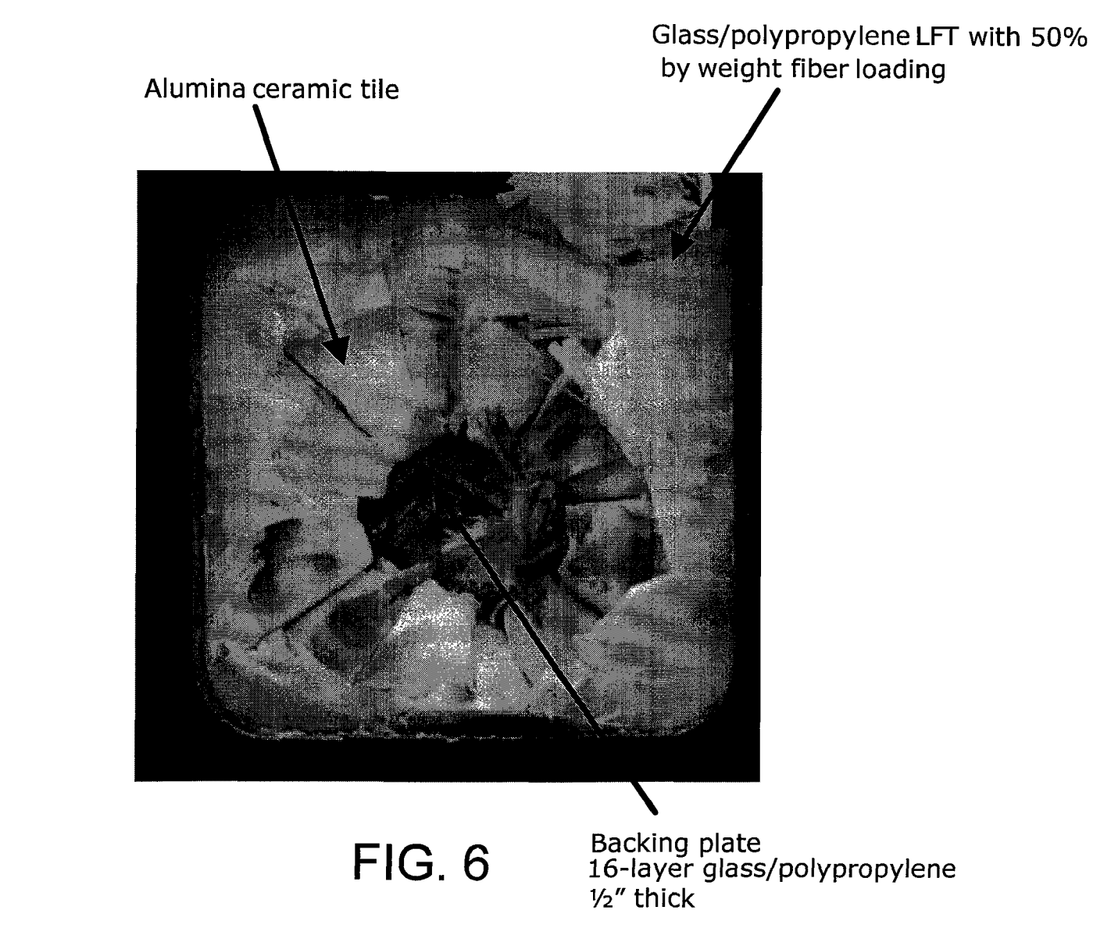
FIG. 6 is a digital image of an exemplary embodiment of a protective composite structure after stopping of a 50 cal AP at 575 m/s.

FIG. 6 is a digital image of an exemplary embodiment of a protective composite structure after stopping of a 50 cal AP at 575 m/s. The protective composite structure includes an LFT (glass/polypropylene LFT with 50% by weight fiber loading), a ceramic tile (alumina ceramic tile of 0.5" thickness), and a thermoplastic woven tape backing that includes (16-layer glass/polypropylene backing of ½" thickness).

The invention claimed is:

1. A composite structure, comprising:
a backing substrate;
a layer of structures distributed over the backing substrate; and
a long fiber thermoplastic disposed onto the structures and the backing substrate, wherein the thermoplastic substantially binds the backing substrate and the layer of structures together;
wherein the long fiber thermoplastic includes:
a material selected from polypropylene, nylon-based polymers, polystyrene, acrylonitrile butadiene styrene (ABS), styrene acrylonitrile (SAN), polyethersulphone (PES), polyetherimide (PEI), polyetheretherketone (PEEK), polyetherketone (PEK), and combinations thereof; and
a fiber selected from an aramid fiber, a nylon fiber, a glass fiber, a carbon fiber, and combinations thereof.

2. The structure of claim 1, wherein the long fiber thermoplastic substantially encapsulates the layer of structures.

3. The structure of claim 1, wherein the long fiber thermoplastic penetrates the backing substrate.

4. The structure of claim 1, wherein the long fiber thermoplastic substantially encapsulates the layer of structures and penetrates the backing substrate.

5. The structure of claim 1, wherein the fiber has a length of about 3 to 50 mm.

6. The structure of claim 1, wherein the fiber has a length of about 12 to 38 mm.

7. The structure of claim 1, wherein the long fiber thermoplastic has a fiber loading of about 10 to 80 weight % loading of fiber in the long fiber thermoplastic.

8. The structure of claim 1, wherein the backing substrate layer includes thermoplastic polymers with reinforcing fibers.

9. The structure of claim 1, where a backing substrate layer is selected from S-glass, carbon, E-glass, metal, polyethylene, aramid, and combinations thereof.

10. The structure of claim 1, wherein the structures are selected from ceramic structures, metallic structures, and combinations thereof.

11. The structure of claim 1, wherein the structures are selected from ceramic plates, metallic plates, and combinations thereof.

12. The structure of claim 1, wherein the fiber is an aramid fiber.

13. The structure of claim 1, wherein the fiber is a nylon fiber.

14. The structure of claim 1, wherein the fiber is a carbon fiber.

15. The structure of claim 1, wherein the backing substrate layer is made of carbon fiber.

16. The structure of claim 1, wherein the backing substrate layer is made of metal.

17. The structure of claim 1, wherein the backing substrate layer is made of a polyethylene material.

18. The structure of claim 1, wherein the backing substrate layer is made of an aramid fiber.

19. A structure, comprising armor attached to the structure, wherein the armor includes a composite structure comprising:
a backing substrate;
a layer of structures distributed over the backing substrate; and
a long fiber thermoplastic disposed onto the structures and the backing substrate, wherein the thermoplastic substantially binds the backing substrate and the layer of structures together;
wherein the long fiber thermoplastic includes:
a material selected from polypropylene, nylon-based polymers, polystyrene, acrylonitrile butadiene styrene (ABS), styrene acrylonitrile (SAN), polyethersulphone (PES), polyetherimide (PEI), polyetheretherketone (PEEK), polyetherketone (PEK), and combinations thereof; and
a fiber selected from an aramid fiber, a nylon fiber, a glass fiber, a carbon fiber, and combinations thereof.

20. The structure of claim 19, wherein the structure is a vehicle.

21. The structure of claim 19, wherein the structure is a building.

* * * * *